Aug. 8, 1950 — C. A. ERICKSON — 2,518,298
PUMP
Original Filed Nov. 24, 1944
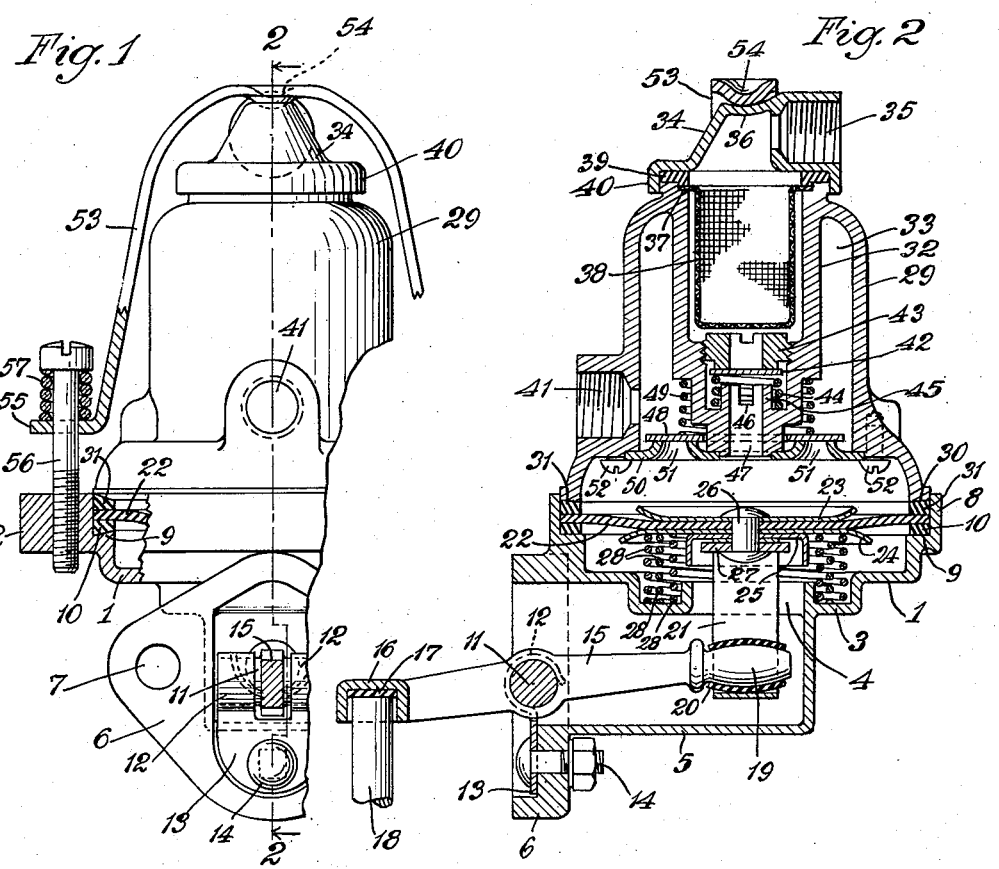
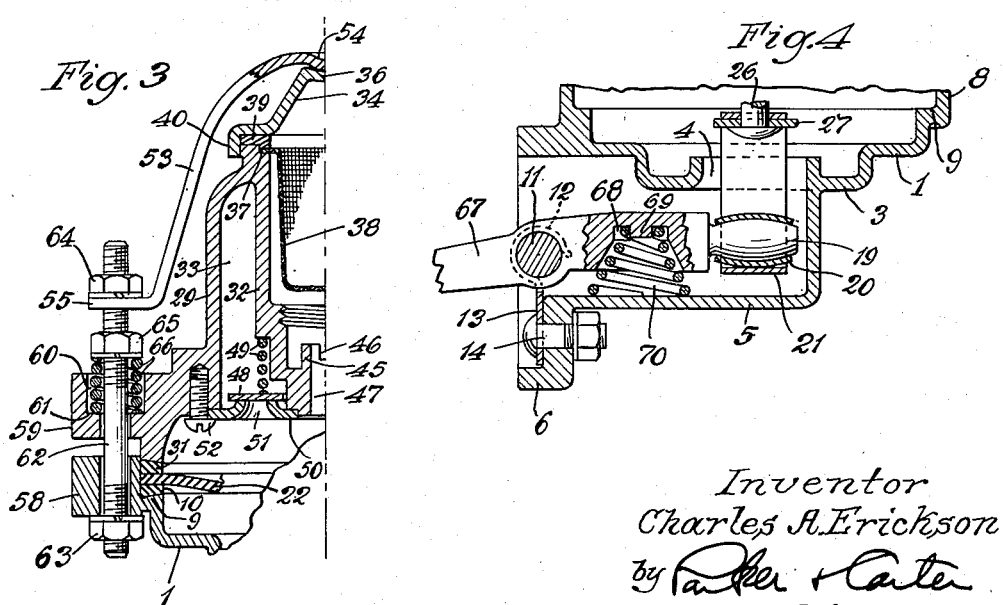
Inventor
Charles A. Erickson
by Parker & Carter
Attorneys.

Patented Aug. 8, 1950

2,518,298

UNITED STATES PATENT OFFICE 2,518,298

PUMP

Charles A. Erickson, Dearborn, Mich., assignor, by mesne assignments, to F. L. Jacobs Co., Detroit, Mich., a corporation of Michigan Original application November 24, 1944, Serial No. 564,961. Divided and this application January 28, 1946, Serial No. 643,853

8 Claims. (Cl. 103—150)

This invention relates to a pump and to means for providing a sturdy, compact pump construction. It has for one object to provide suitable means for joining the parts of a pump housing.

It has for another object to provide means for joining them yieldingly together.

Another object is to provide, in connection with a pump housing, joining means including yielding members in the attaching mechanism.

Other objects will appear from time to time in the course of the specification and claims.

The invention is illustrated more or less diagrammatically in the accompanying drawings, wherein:

Figure 1 is an elevation of one form of the pump, with parts in section and parts broken away;

Figure 2 is a transverse section taken at line 2—2 of Figure 1;

Figure 3 is a fragmentary section illustrating a modified form of bail construction; and Figure 4 is a fragmentary section of the device of Figure 2, showing a modified form of diaphragm moving mechanism.

Like parts are indicated by like characters throughout the specification and the drawings.

In the construction shown, a pump is formed generally of two housing members. Means are provided for joining them removably together and a diaphragm is gripped between the two members. The operating mechanism is in the main positioned within one housing member, and the pump inlet and outlet connections and inlet and outlet valves are positioned in another housing member. The construction thus forms in effect two separable units. The diaphragm and diaphragm operating means are positioned mainly in one housing member, and the diaphragm is gripped between the two.

As shown, 1 is a lower housing member. It is provided with two perforated and threaded ears 2. It is shaped to provide a trough-like section 3 and an opening or perforation 4. A preferably integral extension 5 terminates in a flange 6 which is perforated, as at 7, to receive screws or other attaching means by which the pump is mounted on a base which will usually be a convenient portion of an engine with which the pump is to be used.

The section 1 is also provided with an upstanding flange 8 which is positioned about a shoulder 9 against which a packing 10 may be positioned. The shoulder may be flat or may be slightly inclined, if desired, depending upon the shape or type of packing or gasket 10 which is to be used.

A pin or shaft 11 is positioned in two spring members 12 which are themselves attached to or formed as a part of a support 13. The member 13 is held in place by a bolt 14, or otherwise.

A diaphragm operating lever 15 is supported by the shaft 11 and may be integral with it or may be mounted to rotate about it. At one end the lever 15 is provided with a socket 16 which may have a cushioning and sound deadening member 17 fixed in it. A push rod 18 may be reciprocated to move the lever 15 up and down. The lever 15 is provided at its opposite end with a rounded portion 19 about which a cushioning sleeve 20 of rubber or comparable material may be positioned.

When the parts are assembled, the member 20 is received in a stirrup-like member 21 which is fastened to the diaphragm.

22 is a diaphragm positioned against the packing or gasket 10. It may be provided on its upper surface with a rigid stiffening member 23 and on its lower surface with a similar member 24 which may, if desired, be wider than the member 23. A cup-like member 25 may also be positioned on the lower side of the diaphragm. A bolt 26 passes through the diaphragm, through the members 23, 24 and 25 and through the stirrup 21. If desired, a washer or laterally projecting member 27 may be positioned within the stirrup and under one end of the rivet 26. A spring or springs 28 are positioned in the member 3 beneath the diaphragm and they bear at one end against the member 3 and at the opposite end against the member 24. The springs are biased to raise the diaphragm when free to do so.

An upper housing member is indicated generally by the member 29. Beneath its lower edge 30 is positioned a gasket or packing 31 which is in contact with the upper edge of the diaphragm 22. The edge 30 may fit within the upstanding flange 8 of the lower housing section, as shown particularly in Figure 2, or it may not, as shown in Figure 1.

The housing member 29 is provided with an internal preferably integral member 32. The members 29 and 32 thus define between themselves an annular pressure dome 33. The member 32 is open at its upper end to receive an inlet connection 34. It has a tapped opening 35 for connection to a fluid supply. The member 34 may be provided with a depression 36 to engage a bail or other attaching means. The member 32 is also preferably provided with a shoulder 37, within which the upper edge of a strainer 38 is seated, the strainer lying generally within the cavity defined by the member 32. A packing or gasket 39 is positioned on the edge 37 and within the fitting 34. The member 34 is preferably provided with a downwardly depending flange 40 which overhangs and fits about the upper end of the upper housing section 29.

A tapped outlet opening or connection 41 is provided in communication with the space 33 and may receive an outlet pipe or conduit.

Within the upper housing 29 are positioned inlet and outlet valves. Thus the disc valve 42 is positioned against the plug 43 and is held yieldingly seated by a spring 44. The spring is positioned about an upstanding member 45 which is preferably integral with the member 32 although it might be attached to it. One or more slots 46 are cut or formed in the member 45. The member 29 is provided with an inlet passage 47 through which fluid flows after it has passed through the screen or strainer 38 and has passed inwardly beyond the inlet valve 42.

An outlet valve 48 is positioned to control the outlet of fluid. It is preferably in the shape of a flat annulus and may be positioned about the member 32. A spring 49 is biased to press the outlet valve 48 against an annular valve seat 50 which is positioned as shown across the gap between the members 29 and 32. It is provided with a plurality of openings 51 and may be held in place by screws 52, or otherwise.

The two housing sections 1 and 29 are held yieldingly together by a bail 53 which is provided with a depression 54 to fit into the depression 36 of the member 34. At each end the bail is provided with perforated ears 55. Bolts or screws 56 are seated in the ears 2 of housing section 1 and may be adjusted in these members. Springs 57 are positioned one beneath the head of each of the screws 56. The springs thus bear against the screws and the ears 55 of the bail 53. The compressive effect upon the spring may be adjusted by the degree to which the screws 56 are screwed into position.

In the modified form of Figure 3 the pump construction is the same as shown and the bail is the same as shown. The attaching means for the bail, however, are different. Instead of the threaded ears 2, the lower pump section 1 is provided with perforated ears 58 and the upper section 29 is provided with corresponding perforated ears 59. Within the ears 59 may be formed cavities 60 at the bottom of each of which is provided a shoulder 61. A screw or bolt 62 is positioned through each pair of ears and at its lower end has mounted upon it a nut 63. At its upper end a nut 64 is mounted on each screw and bears against the ear 55 of the bail 53. An intermediate nut 65 is positioned on each screw and serves adjustably to compress a spring 66.

In the modified form of Figure 4 the construction of the diaphragm operating means appears. As there shown, instead of the lever 15, a lever 67 is provided. This lever is formed with a depression 68 in which a raised portion 69 is positioned. A spring 70 is seated over or about the raised portion 69 within the depression 68 and bears at its opposite end upon the floor of the section 5 of the member 1. The spring 70 is biased to force the right end of the lever 67 upwardly.

This application is a division of my copending application, Serial No. 564,961, filed November 24, 1944, now United States Letters Patent No. 2,485,439, issued October 18, 1949.

The use and operation of this invention are as follows:

The device is shown as assembled and is positioned in a liquid line so that liquid may enter through the connection 35 and be discharged through the connection 41. When the diaphragm is raised and lowered, alternate compression and suction strokes are accomplished. The entering liquid passes through the filter 38 and on a suction stroke the inlet valve 42 is depressed from the seat 43 against the resistance of the spring 44 and liquid passes through the openings 46 into the chamber bounded by the diaphragm. On the following compression stroke, when the diaphragm is raised by the springs 28, compression seats the valve 42 and unseats the valve 48 and liquid passes through the outlet openings 51 and the discharge passage 41. The annular space 33 acts as a pressure dome to equalize the flow of liquid through the pump.

The movements of the diaphragm are controlled by the movement of the levers 15 and 67.

In the modified form of Figure 4, the spring 70 assists the movement of the lever 67 in the compression direction.

The bail constructions of Figures 1 and 3 permit the joining of the housing sections under yieldable conditions so that should excessive pressure develop within the pump, the housing sections may yield to avoid breakage. Also, the presence of the springs in the attaching means insures a "live" compressive effect in holding the two housing sections together.

I claim:

1. In combination in a pump assembly, a pair of housing members, a diaphragm seat formed on each of said members, a diaphragm positioned between said members and said seats, and a bail positioned upon one of said housing members, and means for securing the bail to the other of said housing members, said means including screws engaging the other of said housing members and engaging said bail, and springs positioned between said screws and said bail.

2. In combination in a pump assembly, a pair of housing members, a diaphragm seat formed on each of said members, a diaphragm positioned between said members and said seats, and a bail positioned upon one of said housing members, and means for securing the bail to the other of said housing members, said means including screws engaging the other of said housing members and engaging said bail, and springs positioned between said screws and said bail, said screws being adjustably engaged in said other of said housing members whereby the compression of said springs may be varied.

3. In combination in a pump assembly, a pair of housing members, a diaphragm seat formed on each of said members, a diaphragm positioned between said members and said seats, a pair of packing members positioned one on each side of the periphery of said diaphragm and in contact with the adjacent of said housing members, a bail positioned upon one of said housing members, and means for securing the bail to the other of said housing members, said means including screws engaging said other of said housing members and engaging said bail, and springs positioned between said screws and said bail.

4. In combination in a pump assembly, a pair of housing members, a diaphragm seat formed on each of said members, a diaphragm positioned between said members and said seats, and a bail positioned intermediate its ends upon one of said housing members, and means for securing the bail to the other of said housing members, said means including screws engaging the other of said housing members and engaging the ends of said bail, and springs positioned between said screws and said bail.

5. In combination in a pump assembly, a pair of housing members, a diaphragm seat formed on each of said members, a diaphragm positioned between said members and said seats, and a bail positioned intermediate its ends upon one of said housing members, and means for securing the bail to the other of said housing members, said means including screws engaging the other of said housing members and engaging the ends of said bail, and springs positioned between said screws and said bail, said screws being adjustably engaged in said other of said housing members, whereby the compression of said springs may be varied.

6. In combination in a pump assembly, a pair of members defining a pump housing, a diaphragm positioned between said members, and means for holding the members together to grip the periphery of said diaphragm, said means including perforated projections formed on each housing member, and bolts passing through said projections, nuts on each of said bolts, a spring engaged by one of said nuts and bearing upon one of said housing members, whereby the housing members are held together under compression, and a bail bearing upon one of said housing members and engaged upon said bolts and nuts for holding said bail in adjustable engagement with said bolts.

7. In combination in a pump assembly, a pair of members defining a pump housing, a diaphragm positioned between said members, and means for holding the members together to grip the periphery of said diaphragm, said means including perforated projections formed on each housing member, and bolts passing through said projections, nuts on each of said bolts, a spring engaged by one of said nuts and bearing upon one of said housing members, whereby the housing members are held together under compression, the nut in engagement with said spring being adjustable upon the bolt to vary the degree of compression, and a bail bearing upon one of said housing members and engaged upon said bolts and nuts for holding said bail in adjustable engagement with said bolts.

8. In combination in a fuel pump assembly, a pair of members defining a pump housing, a diaphragm positioned between said members, and means for holding the members together to grip the periphery of said diaphragm, said means including a pair of perforated projections formed on one of said members at opposite sides thereof, a bolt mounted in each of said perforations, a bail bearing upon the other of said housing members and having its ends engaged upon said bolts for holding said ends in adjustable relation to said one of said housing members, and springs encircling said bolts and acting to hold said housing members together under compression.

CHARLES A. ERICKSON.

REFERENCES CITED

The following references are of record in the file of this patent:

UNITED STATES PATENTS

| Number | Name | Date |
| --- | --- | --- |
| 1,711,803 | Munday | May 7, 1929 |
| 1,985,282 | Carter | Dec. 25, 1934 |
| 2,222,869 | Jencick | Nov. 26, 1940 |
| 2,356,738 | Brugger | Aug. 29, 1944 |
| 2,485,439 | Erickson | Oct. 18, 1949 |